Patented Aug. 14, 1951

2,564,581

UNITED STATES PATENT OFFICE 2,564,581

CELLULOSE ETHER COMPOSITION

George H. Pyle, Hopewell, Va., and David R. Wiggam, West Grove, Pa., assignors to Hercules Powder Company, Wilmington, Del., a corporation of Delaware No Drawing. Application July 30, 1946, Serial No. 687,228

23 Claims. (Cl. 106—174)

This invention relates to cellulose ether compositions and molding thereof. More particularly, it relates to thermoplastic cellulose ether compositions and to a method for molding such compositions under heat without causing discoloration thereof.

Thermoplastic compositions based upon ethyl cellulose and similar thermoplastic ethers of cellulose have been found useful where the properties of toughness, dimensional stability, and flexibility at extremely low temperatures have been particularly required. However, molding under heat at such temperatures as 200°–300° C. has had the effect of causing a very considerable discoloration of the cellulose ether compositions. Thus, compositions depositing a colorless mass from solution have given relatively dark amber masses much like tortoise shell upon being molded under heat. In addition, there has been considerable loss of viscosity; i. e., degradation, leading to brittle molded products. The problem of stabilization is particularly difficult where relatively high heats are required, as in fast molding, as distinguished from low heat operations, solvent coating, and the like.

It has been possible in the past to stabilize the viscosity of ethyl cellulose to some extent by addition of certain alkaline substances, certain amines, and certain phenolic bodies. In most cases, these materials have tended to add color themselves or have caused an increase in the usual formation of color of the ethyl cellulose. In only a few cases has color development been less than that obtained where no stabilizer has been used. Even in these cases, the extent of color improvement over unstabilized molded material has been insufficient and has been obtainable largely under moderate, rather than high, heat conditions.

Some attempts have been made to improve color by treatment with bleaching agents and by treatment with acids. Where such improvements in color have been retained in the molding operation, they have resulted in such extreme loss of viscosity that a relatively useless molded product results. Even mildly bleaching, slightly acidic agents, such as sulfur dioxide, have been found to cause crazing, scorched dark spots, brittleness; i. e., local or general degradation at molding temperatures of 200° C., and above, either immediately or on normal aging. As a result, it has not been possible to prepare clear, colorless, molded ethyl cellulose articles or even to prepare molded ethyl cellulose articles in pale or pastel shades. Ethyl cellulose molded articles have, therefore, been made only in pigmented or dark colors.

In accordance with this invention, a method has been found whereby ethyl cellulose and other thermoplastic cellulose ethers may be molded at elevated temperatures such as 200° C. and above to form tough, shaped articles very greatly improved in color after molding as compared with previous molded compositions of this nature. It has been found that clear, relatively colorless moldings and moldings in light and pastel shades can successfully be prepared. This is accomplished by carrying out the molding operation under heat in the presence of both a small amount of sulfur dioxide and a phenylol menthane or other monophenylol-substituted saturated terpene compound. The terpene compound may be represented by the general formula

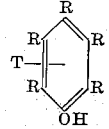

wherein T is a cyclic saturated terpene, one hydrogen of which is substituted by the phenol, one R of the phenolic group being said terpene, the other R's being hydrogen, or at least two hydrogens with the rest saturated hydrocarbon or alkoxyl groups.

The preferred method of accomplishing the result of this invention comprises incorporating a compound which decomposes at a temperature of 200° C. with evolution of sulfur dioxide, for example, an aliphatic sulfone such as butadiene sulfone, and a terpene compound of the type hereinabove-mentioned in the cellulose ether molding composition, and then molding the composition under heat. By this method, a small amount of sulfur dioxide is released under the heat of the molding operation. Obviously, a compound releasing sulfur dioxide at below 200° C. will release it at 200° C. or on being heated thereto. In molding, the temperature will be at least sufficient to cause release of sulfur dioxide from the particular compound used. Thus, there is provided a thermoplastic cellulose ether molding composition containing both the compound capable of releasing sulfur dioxide and the monophenylol-saturated terpene compound. Such a composition is capable of being molded to strong, tough articles which may be of pale color or a pastel shade or of very greatly reduced color in the case of clear articles.

Alternatively, a cellulose ether composition containing the terpene compound mentioned may be molded while passing a small stream of sulfur dioxide into the molding chamber or into a chamber or hopper by which the thermoplastic composition is led to the molding chamber. A similar result is obtained by subjecting a molding powder of the cellulose ether composition to an atmosphere of sulfur dioxide, whereby it absorbs some of the sulfur dioxide, and then molding the composition by compression, injection, or extrusion under heat before the absorbed sulfur dioxide has been lost.

In view of the acidic nature of sulfur dioxide and in view of the fact that phenolic bodies are, in general, of an acidic rather than basic nature, it is surprising and unexpected that the combination of these materials in cellulose ether compositions at molding temperatures brings about formation of tough, undegraded products of improved color. Heretofore, it has been the experience in this field that acids caused severe degradation, sometimes accompanied by discoloration, when cellulose ethers are exposed to heat or aged. Furthermore, it has been found that the color of the molded article is distinctly better using the stabilization combination of this invention than when either of the two groups of substances is used alone in any quantity. In fact, the use of compounds which release sulfur dioxide alone may cause formation of dark, "scorched" spots; i. e., degraded areas, either immediately upon molding or upon aging of the molded article. In addition, crazing upon exposure is likely to result. Both of these disadvantages are overcome by the present invention.

The invention will be illustrated by the examples of preparation of molding compositions and preparation of molded articles therefrom which follow. All parts and percentages given are by weight.

EXAMPLE 1

Seven grams of 1-para-phenylol para-menthane (prepared by hydrogenating one of the two double bonds of dipentene and then condensing the hydrogenated product with phenol) was dissolved in 62 grams of dibutyl phthalate. Three and one-half grams of butadiene sulfone was then dissolved in this mixture. The resulting solution was added to 175 grams of ethyl cellulose (45.3% ethoxyl and 98 centipoises viscosity) and the resulting mass placed upon a two-roll plastic compounding mill with the rolls at 145° C. With the mill running, an additional 175 grams of ethyl cellulose was added. The mass was milled for 20 minutes, stripped from the rolls as a well-colloided sheet, broken into pieces, and ground to about 8-mesh with an Abbé cutter to form a molding powder. A quantity of the molding powder (13.5 grams) was molded by compression for 15 minutes at 200° C. into a disk 2.25 inches in diameter and 0.182 inch thick.

The resulting disk was compared with a disk made in a similar manner except that the butadiene sulfone was omitted and also with a disk in which both the sulfone and the phenylol menthane were omitted. The color of the disks was measured upon a scale in which absolute perfection; i. e., air, gives a reading of 999, in which values below 300 represent an amber color so dark as to render the molded material entirely unsuitable for unpigmented clear and pastel moldings, in which values above 400 represent a very substantial improvement, and in which a value of 500 or more is outstanding. On this scale, the disk made according to Example 1 had a color reading of 450, whereas the similar disk without butadiene sulfone had a color reading of 250 and a disk without either the sulfone or the phenylol menthane had a color reading of about 180. The color measurements were made with a photoelectric colorimeter which measured the ratio of blue to red in transmitted light.

EXAMPLE 2

One hundred and ten grams of butadiene sulfone was dissolved in 225 grams of water. This solution was then slowly sprayed upon an agitated mass of 25 pounds of ethyl cellulose wet with slightly more than an equal weight of water. The mass was thoroughly agitated to distribute the butadiene sulfone. The ethyl cellulose was then dried under vacuum.

One hundred and seventy-five grams of the ethyl cellulose so treated was mixed with a solution consisting of 62 grams of dibutyl phthalate and 7 grams of 1-para-phenylol para-menthane and the resulting mass milled on a two-roll mill with the rolls at 145° C. with an additional 175 grams of the treated ethyl cellulose. Molding powder and disks were prepared as in Example 1. In this case, the disk according to the example gave a color reading of 460, whereas similar disks containing no butadiene sulfone gave a color reading of 230 and without either the sulfone or the phenylol menthane gave a color reading of 175. It was noted that the molding powder in accordance with the example was distinctly less colored than molding powders lacking the butadiene sulfone or the combination of sulfone and phenylol menthane.

EXAMPLE 3

A mass of 5 pounds of a mixture consisting of ethyl cellulose, dibutyl phthalate, 1-para-phenylol para-menthane, and butadiene sulfone in the proportion of 100 parts of cellulose ether, 15 parts of dibutyl phthalate, 2 parts of the phenylol compound, and 1.2 parts of butadiene sulfone was compounded on a two-roll mill at 150° C. for 25 minutes. The batch was then sheeted from the rolls and ground to form molding powder. The molding powder was tested by molding into strips, disks, and combs by the injection method. The color reading on the scale described in Example 1 for disks of this plastic was 550. Similarly compounded and molded articles leaving out the butadiene sulfone had a color reading of 340 and, when both the sulfone and the phenylol menthane were omitted, the color reading was 260.

EXAMPLE 4

Twenty grams of 1-para-phenylol para-menthane and 10 grams of butadiene sulfone were dissolved in 176 grams of dibutyl phthalate, and the resulting solution was mixed with 1,000 grams of ethyl cellulose (45.3% ethoxyl and 86 centipoises viscosity) in a heated Banbury mixer for 5 minutes. Initially, the temperature was 95° C., and at the end of the 5 minutes the temperature had reached 175° C. The plastic mass was sheeted on a two-roll mill at 75°–95° C. and the sheets then ground to form a molding powder. As in the cases of the previous examples, disks were molded from the molding powder. As before, disks and molding powders according to the example were very much less colored than similar disks and molding powders prepared in the same way but with omission of the sulfone and omission of both the sulfone and phenylol menthane. The disk in accordance with this example had a color reading on the scale described in Example 1 of 632, whereas a disk without sulfone had a color reading of 286 and one with neither sulfone nor phenylol menthane had a color reading of 258.

EXAMPLE 5

A solution was made by dissolving 0.25 gram of sodium sulfodioctyl succinate (the sodium bisulfite addition product of dioctyl maleate) in 8.8 grams of dibutyl phthalate. This solution was thoroughly stirred with 50 grams of ethyl cellulose (45.3% ethoxyl and 86 centipoises viscosity) and 1 gram of monophenylol isobornylane. Thirteen and one-half grams of this mixture was molded into a disk by the compression method of Example 1. The color reading of this disk on the scale given in Example 1 was 455, whereas a disk without the sulfo compound and without the phenylol isobornylane had a color reading of 245.

EXAMPLE 6

One-eight of a pound of sodium sulfodioctyl succinate was dissolved in a small amount of 30% aqueous isopropyl alcohol and the resulting solution distributed onto 25 pounds of ethyl cellulose wet with about an equal quantity of water, the whole mass being thoroughly agitated. The treated ethyl cellulose was then dried under vacuum. Fifty grams of this ethyl cellulose was mixed with 8.8 grams of dibutyl phthalate which contained dissolved therein 1 gram of 1-para-phenylol para-menthane by thorough stirring. Thirteen and one-half grams of the mixture was molded into a disk by the compression method described in Example 1. The disk had a color reading on the scale of Example 1 of 440. A disk made in the same manner except without the succinate and without the phenylol menthane gave a color reading of 245.

EXAMPLE 7

A homogeneous mixture of 1-para-phenylol para-menthane and sodium sulfodioctyl succinate was prepared by heating together 70 grams of the former and 14 grams of the latter at 120° C. with stirring. A solution consisting of 1.2 grams of this mixture and 7.8 grams of dibutyl phthalate was thoroughly stirred with 50 grams of ethyl cellulose (45.3% ethoxyl and 86 centipoises viscosity). Thirteen and one-half grams of the resulting mixture was molded into a disk by the compression method given in Example 1. The disk had a color reading on the scale of Example 1 of 452.

EXAMPLE 8

Nineteen grams of dibutyl phthalate, 0.40 gram of 1-para-phenylol para-menthane, and 0.125 gram of diethyl sulfite were mixed to form a solution. This solution was, in turn, thoroughly stirred with 100 grams of ethyl cellulose (45.7% ethoxyl and 92 centipoises viscosity). Thirteen and one-half grams of the resulting mixture was molded into a disk by the compression method given in Example 1. The color reading obtained for this disk on the scale of Example 1 was 535.

EXAMPLE 9

Four hundred grams of flake ethyl cellulose (45.9% ethoxyl and 79 centipoises viscosity) was impregnated with approximately 0.06% of its weight of sulfur dioxide by passing a stream of sulfur dioxide through the ethyl cellulose flake mass for 10 minutes and then passing an air stream through the mass for 2 hours. Four grams of finely powdered 1-para-phenylol para-methane was then tumbled with the 400 grams of ethyl cellulose flake for 1 hour to assure thorough distribution. Thirteen and one-half grams of the resulting treated ethyl cellulose was molded into a disk by the compression method described in Example 1. This disk had a color reading on the scale given in Example 1 of 488. The same ethyl cellulose without sulfur dioxide treatment produced a disk having a color reading of 254.

EXAMPLE 10

Seven grams of 1-para-phenylol para-menthane and 1.75 grams of the sulfone of 2-methyl pentadiene were dissolved in 62 grams of dibutyl phthalate, and the resulting solution then added to 350 grams of ethyl cellulose (46.5% ethoxyl and 103 centipoises viscosity). The resulting mass was milled and molded as in Example 1. The disk obtained had a color reading of 415 on the scale set forth in Example 1.

EXAMPLES 11–21

Using the procedure of Example 1 the formulations set forth in the following table were prepared, milled and molded, the color readings of the molded discs obtained as described in Example 1 being set forth in each case:

*Table I*

| Example | Ethyl Cellulose [1] | Dibutyl Phthalate | 1-Para-Phenylol Para-Menthane | Butadiene Sulfone | Color |
|---|---|---|---|---|---|
| | Parts by weight | Parts by weight | Parts by weight | Parts by weight | |
| 11 | 350 | 62 | .7 | 0.7 | 310 |
| 12 | 350 | 62 | .7 | 1.23 | 428 |
| 13 | 350 | 62 | .7 | 1.75 | 460 |
| 14 | 350 | 62 | .7 | 2.9 | 444 |
| 15 | 350 | 62 | .7 | 3.6 | 450 |
| 16 | 350 | 62 | .7 | 5.25 | 455 |
| 17 | 350 | 62 | .7 | 0 | 240 |
| 18 | 350 | 62 | 1.75 | 1.75 | 406 |
| 19 | 350 | 62 | 3.5 | 1.75 | 439 |
| 20 | 350 | 62 | 14.0 | 1.75 | 445 |
| 21 | 350 | 62 | 0 | 0 | 180 |

[1] NOTE: The ethyl cellulose had an ethoxyl content of 45.3% and viscosity of 98 centipoises.

EXAMPLES 22–31

Using the formulation, milling and molding procedure of Example 1 and obtaining color readings on molded discs as described in Example 1, the following examples were carried out:

*Table II*

| Example | Ethyl Cellulose [1] | Plasticizer | 1-Para-Phenylol Para-Menthane | Butadiene Sulfone | Color |
|---|---|---|---|---|---|
| | Parts by weight | Parts by weight | Parts by weight | Parts by weight | |
| 22 | 350 | 62 Dimethyl Phthalate | .7 | 1.75 | 460 |
| 23 | 350 | do | .7 | 0 | 234 |
| 24 | 350 | 62 Diethyl Phthalate | .7 | 1.75 | 413 |
| 25 | 350 | do | .7 | 0 | 226 |
| 26 | 350 | 62 Butyl Stearate | .7 | 1.75 | 378 |
| 27 | 350 | do | .7 | 0 | 203 |
| 28 | 350 | do | 0 | 0 | 170 |
| 29 | 350 | 62 Triphenyl Phosphate | .7 | 1.75 | 534 |
| 30 | 350 | do | .7 | 0 | 274 |
| 31 | 350 | do | 0 | 0 | 200 |

[1] NOTE: The ethyl cellulose had an ethoxyl content of 45.3% and viscosity of 98 centipoises.

The method and compositions of this invention call for use of cellulose ethers of the thermoplastic type and of sufficient degree of polymerization to yield tough, molded articles. In general, cellulose ethers soluble in any of the common organic solvents, such as acetone, benzene, toluene-alcohol, methanol, ethanol, ethyl acetate, butyl acetate, and the like, are of the required thermoplastic type. Ethyl cellulose having an ethoxyl content between about 37% and about 52%, preferably between about 43% and about 48% and having a viscosity of at least about 20 cp., is particularly suitable. However, thermoplastic propyl cellulose, ethyl propyl cellulose, ethyl butyl celluose, methyl ethyl cellulose, and benzyl cellulose are likewise useful in molding compositions, and, like ethyl cellulose, their molding compositions are very greatly improved in color of the molded product by proceeding in accordance with this invention. It is desirable that the cellulose ethers be so prepared or purified as to eliminate any substantial proportion of free acid. Thus, treatment with strong acids should be avoided unless there is subsequent neutralization of any free acid groups by basic ions, such as sodium, calcium, magnesium, cesium, copper, and the like.

The sulfur dioxide may be provided as such at the time of molding by flushing the molding equipment therewith or by subjecting molding powder to a stream of sulfur dioxide. Likewise, flake ethyl cellulose may be saturated with gaseous sulfur dioxide prior to incorporating it into a molding composition. Usually, it is more convenient to incorporate in the molding composition a compound which will decompose at the molding temperature to form sulfur dioxide. Such a compound may be incorporated in the cellulose ether at the time it is manufactured or it may be incorporated in the preparation of the molding composition. Either of the latter procedures has the advantage of providing the cellulose ether with a color protective influence during the milling needed to form a molding powder.

Any compound which is substantially colorless, which does not discolor under heat, and which does not in itself function as an acid stronger than sulfurous acid is suitable. The sulfones of aliphatic compounds, such as those derived from butadiene, piperylene, isoprene, 2-methyl pentadiene, amyldiene, or other diene hydrocarbons, are particularly useful since they release sulfur dioxide freely at 200° C. without leaving any appreciable residue. Polypropylene sulfone, polyalkyl-polysulfones generally, and cyclic dipropylene sulfone are effective. Aliphatic sulfonates provide another group of compounds which, in most cases, give off sulfur dioxide at 200° C.; such sulfonates as sodium sulfodiethyl succinate, sodium sulfodipropyl succinate, sodium sulfodibutyl succinate, sodium sulfodiamyl succinate, sodium sulfodihexyl succinate, sodium sulfodioctyl succinate, sodium sulfodilauryl succinate, and similar equivalent potassium compounds, and similar derivatives of substituted succinates, have been found particularly suitable since the residue is quite compatible in the cellulose ether compositions and, in fact, functions as a plasticizer. These compounds may be prepared by condensation of sodium bisulfite with the corresponding esters of maleic acid. Any aliphatic or alicyclic sulfonate which will release sulfur dioxide upon heating is suitable. Alkyl and other organic sulfites, for example, dimethyl sulfite, diethyl sulfite, dibutyl sulfite, methyl bisulfite, ethyl bisulfite, acetone bisulfite, normal-heptaldehyde bisulfite, and sodium formaldehyde sulfoxylate, were found to function by release of sulfur dioxide at 200° C. Inorganic compounds, such as sodium bisulfite, sodium metabisulfite, potassium bisulfite, calcium bisulfite, sodium hydrosulfite, and the like, which are capable of releasing sulfur dioxide upon heating at 200° C. have also been found suitable. The inorganic materials are of use in pale pigmented molding compositions but tend to add haze to compositions intended for clear moldings.

The quantity of sulfur dioxide or sulfur dioxide-releasing material will, in general, be quite small but may vary considerably with the particular compound utilized. It is most easily expressed on the basis of the content of sulfur dioxide in free or combined form, and, on this basis, at least about 0.005% by weight of sulfur dioxide based upon the cellulose ether in the molding composition should be present during the molding operation in order to obtain improvement in color of the molded article. Preferably, a quantity between about 0.05% and about 0.5% of sulfur dioxide based on the weight of the cellulose ether will be utilized, it being understood that this amount represents only the sulfur dioxide content of the actual compound present. In general, no more than about 0.2% of sulfur dioxide in loosely combined form need be present, and in view of the possibility of corrosion of equipment by sulfur dioxide, no more than this amount will ordinarily be used. In any case, no more than 2% of combined or free sulfur dioxide should be used because of development of objectionable odor and degradation, scorching, etc. in the finished plastic.

Where gaseous sulfur dioxide is used, only a small amount need be passed through the molding composition as absorption of only very small amounts is needed. Thus, only 0.06% based on the ethyl cellulose (absorbed by the flake) gave an outstanding improvement in Example 9. Where butadiene sulfone is used, 0.2 to 0.5% on the weight of the cellulose ether (equivalent to 0.11% to 0.27% sulfur dioxide) is an optimum quantity, some of the sulfur dioxide being released in milling to form molding powder and the remainder, or some of the remainder being released in molding. However, 0.01% to 2.0% of the sulfone, based on the cellulose ether, may be used. When sodium sulfodioctyl succinate or homologous compound is used, 0.3% to 1.0% of the compound is optimum, although 0.05% to 4.0% may be used. (This represents 0.005% to 0.29% sulfur dioxide based on the cellulose ether.) The amount may be less than in the case of butadiene sulfone, as indicated by the figures, because there is less sulfur dioxide released in milling to form molding powder, and, therefore, relatively more sulfur dioxide available in the molding operation. It will be appreciated that, depending on particular compounds, compositions, and uses, the optimum quantities will vary considerably.

The monophenylol-substituted saturated terpene compound utilized in accordance with this invention has the general formula

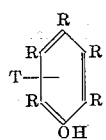

in which T is a saturated cyclic terpene, one hydrogen of which is replaced by the aromatic grouping shown at one of the positions R, the remaining R positions being taken by hydrogen or by hydrogen and up to two saturated hydrocarbon or alkoxy groups. T may be represented by menthane, pinane, carane, camphane, isocamphane, fenchane, isobornylane, dicamphane, isobornyl camphane, each with one hydrogen replaced or T may be considered as a saturated cyclic radical, such as a menthyl, bornyl, isobornyl, or fenchyl radical. Other saturated cyclic terpene groups represented by T are, for example, pinol, cineol, pinocamphone, santenol, santenone, fenchone, fenchyl alcohol, epicamphor, menthol, carvomenthol, with one hydrogen, in each case, replaced.

It has been found that, although only one phenol group may be present, more than one saturated cyclic terpene group may be included in the stabilizer molecule. Thus, in the structural formula hereinbefore given, up to two R positions, remaining after the initial terpene linkage, may be taken by further saturated cyclic terpene groups (which will, in general, be saturated hydrocarbon groups), instead of by hydrogen or by saturated hydrocarbon groups, such as methyl, ethyl, hexyl, cyclohexyl, and the like, or alkoxy groups such as methoxyl, ethoxyl, and the like, or combinations of such groups.

The phenylol saturated terpenes include the reaction products of phenols with monocyclic terpenes having one double bond or with saturated terpenes as hereinafter described or with dicyclic terpenes having only one double bond and which do not isomerize to form terpenes having more than one double bond under the conditions present in the reaction of condensing with the phenol. The latter type of terpenes includes the bicyclic terpenes, such as camphene, bornylene, alpha-fenchene, beta-fenchene, and gamma-fenchene, none of which isomerizes to form terpenes having two double bonds. In these cases, the resulting products will be bornyl-, isobornyl-, etc., compounds; i. e., saturated terpene compounds with a hydrogen replaced by a phenylol or analogous radical derived from a phenol. Mixtures of the various terpenes may also be used.

A number of monocyclic dihydroterpene-phenol condensates may be utilized as cellulose ether stabilizers in accordance with this invention. Any monocyclic dihydroterpene having the formula $C_{10}H_{18}$ may be condensed with a phenol. Suitable monocyclic terpenes having an empirical formula of $C_{10}H_{18}$ are the para-menthenes, such as 1-para-menthene, 2-para-menthene, 3-para-menthene, 1(7)-para-menthene, 4(8)-para-menthene, and 8-para-menthene, as well as the dihydropyronenes.

When menthenes are prepared by the hydrogenation of the exocyclic double bond in substantially pure dipentene, it is desirable that this hydrogenation be carried out to the extent of about 105% to about 110% of one double bond in order to obtain the most desirable results. This insures elimination of compounds having two double bonds in the menthene product.

The para-menthene type of terpene may be conveniently produced by hydrogenating crude dipentene in a suitable closed system using a hydrogen pressure of about 25 to about 2,000 lb./sq. in. and temperatures between about 25° C. and about 200° C. in the presence of a suitable hydrogenation catalyst. They may also be obtained by dehydration of dihydroterpineols. Monocyclic terpenes containing one double bond formed by means of liquid or vapor phase thermal isomerization of dihydropinene (pinane) are also operable.

Another type of stabilizer used according to the present invention is obtained by condensation of a phenol with saturated terpenes such as pinane and tricyclene. Although the mechanism of this type of condensation is not clear, it is believed that these saturated terpenes isomerize to form terpenes having one double bond and that the phenol reacts at the double bond as in the case of the monocyclic dihydroterpenes or of the above terpenes having one double bond, such as camphene, to form a final product which is saturated in the terpenic portion of the molecule.

Dicyclic terpenes with a single double bond and a formula of $C_{10}H_{16}$, for example, camphene, bornylene, and the fenchenes, also condense by addition with phenols to form suitable stabilizers useful in the present invention. Again, the terpenic radical is saturated in the product. Similarly, diterpenes with a single double bond, herein considered as terpenes, for example, the diterpenes prepared by dimerizing camphene, bornylene, and other terpenes and which may be regarded as isobornyl camphene, dicamphene, diisobornylene, or isomers thereof, react with phenols to form suitable stabilizers.

Although any phenol may be condensed with the above substances, the following are typical: phenol, ortho-, meta- and para-cresols, para-tertiary butyl phenol, para-tertiary amyl phenol, ortho-xylenol, para-xylenol, thymol, the various dialkyl hydroxybenzenes, guaiacol, etc.

A typical preparation of a phenylol saturated terpene is as follows:

The menthenes used in this preparation were obtained by the vapor phase catalytic dehydration of dihydro-alpha-terpineol at 275° C. A quantitative yield of menthene was obtained. Four parts of $BF_3$ were absorbed in a solution of 97 parts phenol in 65 parts benzene. Eighty-eight parts of the above-prepared menthene was added dropwise with vigorous agitation to the $BF_3$ solution at a temperature of 10° to 20° C. Agitation was then continued for a period of 3 hours at a temperature of 20° to 30° C. The reaction mixture was washed with hot water to remove the catalyst and part of the unreacted phenol, and the resulting water-washed mixture was subjected to evaporation at 20 mm. pressure, using a final bath temperature of 215° C. to 220° C. to remove solvent and any remaining free phenol. A substantially quantitative yield of 143 parts of residue was obtained which crystallized on standing at room temperature. One hundred and twenty-five parts of the residue was vacuum distilled at about 1 to 3 mm. pressure to produce 104 parts of colorless distillate which came over at a vapor temperature of about 179° C. to about 182° C. The product crystallized on standing and had a hydroxyl content of 7.5%.

Condensation of cyclic terpenes having one double bond with a phenol in the presence of a catalyst, such as described above, is one method of forming the desired stabilizers. Other methods include the reaction of dihydroterpene halides or dihydroterpene alcohols with a phenol. The catalysts generally useful for these reactions include perchloric acid salts, $BF_3$, hydrogen fluoride, mixtures of mineral acids, activated siliceous materials, activated carbons, and the like.

Since the terpenes described above have, or can form, only one double bond, there is practically no possibility of unsaturated resins or polyphenylols being formed. This is highly advantageous, since such compounds form polymers and other components which discolor badly upon exposure to oxygen, light, heat, and other influences. The single double bond limits the molar proportions of terpene:phenol which can be attained, since no more than one mole of a phenol will react with one mole of a monocyclic dihydroterpene or a terpene having a single double bond as hereinbefore described and identified. Hence, the phenylol terpene products have a terpene: phenol ratio of at least 1:1 and, in some cases, as high as about 3:1.

The crude phenylol terpene reaction product usually boils over a considerable range, dependent upon the identity and purity of the terpene or phenol, reaction conditions, and the purity of the product. Products (or fractions thereof) which boil above about 210° C. vapor temperature have the greatest stabilizing effect, but those boiling between about 160° and 210° C. are also highly effective.

The chief reaction product of the condensation of a menthene with phenol will be a monophenylol menthane, with linkage chiefly in the para position of the phenol. A fraction of the product will be ortho-linked. The hydrogen of the resulting saturated menthane substituted by the phenol will usually be at a tertiary carbon. For example, 1-para-menthene condenses with phenol to form a compound apparently chiefly 1-para-phenylol para-menthane, and this product is so designated herein. This compound and its position isomers have the formula $$C_{10}H_{19}.C_6H_4.OH$$

The monophenylol saturated terpenes are utilized in amounts varying from about 0.5% to about 5% of the weight of the cellulose ether. Preferably, the quantity is between about 1% and about 3%. Amounts larger than 5% produce no substantial additional stabilizing effect, although they are not considered harmful. Amounts below about 0.5% do not bring about the desired stabilization. As shown by the examples, almost any method of incorporating the stabilizer which insures a reasonably homogeneous distribution in the ethyl cellulose is effective. Thus, it may be incorporated in the mixture, colloided to form a molding powder as such or in solution, or may be added in solution to a suspension of cellulose ether in water or in a swelling medium. It may be incorporated merely by tumbling or stirring into flake or granular cellulose ether. Best results are obtained by incorporating the stabilizer prior to colloiding the cellulose ether to form a molding powder.

It will be understood that plasticizers, such as dibutyl phthalate, diethyl phthalate, butyl stearate, triphenyl phosphate, tricresyl phosphate, raw castor oil, nonvolatile mineral oils, methyl phthalyl ethyl glycolate, hydrogenated methyl abietate, and the like, may be incorporated with the cellulose ether as usual in the preparation of plastic masses. Likewise, resins, such as the oil-soluble phenol aldehyde condensates, ester gum, hydrogenated glycerol abietate, pentaerythritol abietate, rosin, and oil-modified alkyd resins, would also be included although, as a rule, these substances are not used extensively in plastics intended for molding. Similarly, waxes, such as paraffin, microcrystalline petroleum waxes, carnauba wax, candelilla wax, montan wax, and Japan wax, may also be included. Pigments, dyes, and fillers may also be included.

The method in accordance with this invention includes shaping with the aid of heat by any mechanical modification. Thus, shaping may be by compression molding under heat, injection molding, or by extrusion, drawing, and the like. Temperatures may vary from 100° to 300° C. The invention is particularly valuable in permitting molding at the relatively high but efficient and frequently necessary temperatures of the order of 190–250° C.

It will be appreciated that the compositions in accordance with this invention are also useful where heat is not essential for shaping but where a composition may be subjected to relatively high temperatures or to moderately high temperatures for long periods of time. Thus, the compositions retain good color and stability over long periods of exposure to heat and light in the form of lacquer films, electrical insulation, impregnated and coated fabric, and in film or sheeting.

It has been found that the compositions in accordance with this invention can be molded at quite high temperatures without the formation of rather dark color as normally encountered with cellulose ethers. The compositions are also stabilized against degradation in the form of severe viscosity drop. Stability of this nature preserves toughness. Furthermore, the compositions are capable of withstanding ultraviolet light of the type encountered in exposure to sunlight and sun lamps for long periods without development of crazed surfaces, dark spots, discoloration, and other degradation. The invention permits the preparation of clear and pastel shades in thermally molded cellulose ether compositions.

What we claim and desire to protect by Letters Patent is:

1. In a process in which a thermoplastic cellulose ether composition is molded or shaped under heat and pressure normally tending to cause discoloration of the composition, the improvement which comprises distributing in the composition a sulfur dioxide-producing compound which is substantially colorless, which does not discolor under heat, which does not in itself function as an acid stronger than sulfurous acid and which releases sulfur dioxide at 200° C., in an amount at least about 0.005% and not more than 2% of the weight of the cellulose ether on the basis of the content of combined sulfur dioxide and from about 0.5% to about 5% of a substituted terpene compound having the formula

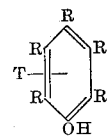

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, and then shaping the composition under heat sufficient to cause release of sulfur dioxide in the shaping operation, whereby said composition is stabilized with respect to viscosity and color during and after said shaping operation.

2. In a process in which a thermoplastic ethyl cellulose composition is molded or shaped under heat and pressure normally tending to cause discoloration of the composition, the improvement which comprises distributing in the composition an alkyl diene sulfone which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5% to about 5% of a substituted terpene compound having the formula

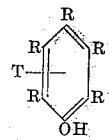

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, and then shaping the composition under heat sufficient to cause release of sulfur dioxide in the shaping operation, whereby said composition is stabilized with respect to viscosity and color during and after said shaping operation.

3. In a process in which a thermoplastic ethyl cellulose composition is molded or shaped under heat and pressure normally tending to cause discoloration of the composition, the improvement which comprises distributing in the composition butadiene sulfone in an amount at least about 0.005% and not more than 2% of the weight of ethyl cellulose on the basis of the content of combined sulfur dioxide and from about 0.5 to about 5% of a substituted terpene compound having the formula

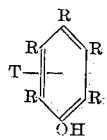

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, and then shaping the composition under heat sufficient to cause release of sulfur dioxide in the shaping operation, whereby said composition is stabilized with respect to viscosity and color during and after said shaping operation.

4. In a process in which a thermoplastic ethyl cellulose composition is molded or shaped under heat and pressure normally tending to cause discoloration of the composition, the improvement which comprises distributing in the composition a sulfodialkyl succinate which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5% to about 5% of a substituted terpene compound having the formula

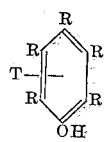

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, and then shaping the composition under heat sufficient to cause release of sulfur dioxide in the shaping operation, whereby said composition is stabilized with respect to viscosity and color during and after said shaping operation.

5. In a process in which a thermoplastic ethyl cellulose composition is molded or shaped under heat and pressure normally tending to cause discoloration of the composition, the improvement which comprises distributing in the composition sodium sulfodioctyl succinate in an amount at least about 0.005% and not more than 2% of the weight of the ethyl cellulose on the basis of the content of the combined sulfur dioxide and from about 0.5% to about 5% of a substituted terpene compound having the formula

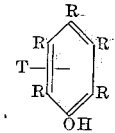

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, and then shaping the composition under heat sufficient to cause release of sulfur dioxide in the shaping operation, whereby said composition is stabilized with respect to viscosity and color during and after said shaping operation.

6. In a process in which a thermoplastic ethyl cellulose composition is molded or shaped under heat and pressure normally tending to cause discoloration of the composition, the improvement which comprises distributing in the composition an aliphatic organic sulfite which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5% to about 5% of a substituted terpene compound having the formula

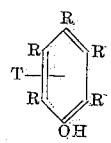

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, and then shaping the composition under heat sufficient to cause release of sulfur dioxide in the shaping operation, whereby said composition is stabilized with respect to viscosity and color during and after said shaping operation.

7. In a process in which a thermoplastic ethyl cellulose composition is molded or shaped under heat and pressure normally tending to cause discoloration of the composition, the improvement which comprises distributing in the composition diethyl sulfite in an amount at least about 0.005% and not more than 2% of the weight of the ethyl cellulose on the basis of the content of combined sulfur dioxide and from about 0.5% to about 5% of a substituted terpene compound having the formula

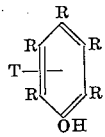

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, and then shaping the composition under heat sufficient to cause release of sulfur dioxide in the shaping operation, whereby said composition is stabilized with respect to viscosity and color during and after said shaping operation.

8. In a process in which a thermoplastic ethyl cellulose composition is molded or shaped under heat and pressure normally tending to cause discoloration of the composition, the improvement which comprises distributing in the composition a sulfur dioxide-producing compound which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5 to about 5% of a monophenylol saturated monocyclic terpene, and then shaping the composition under heat sufficient to cause release of sulfur dioxide in the shaping operation, whereby said composition is stabilized with respect to viscosity and color during and after said shaping operation.

9. In a process in which a thermoplastic ethyl cellulose composition is molded or shaped under heat and pressure normally tending to cause discoloration of the composition, the improvement which comprises distributing in the composition a sulfur dioxide producing compound which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5% to about 5% of 1-para-phenylol para-menthane, and then shaping the composition under heat sufficient to cause release of sulfur dioxide in the shaping operation, whereby said composition is stabilized with respect to viscosity and color during and after said shaping operation.

10. In a process in which a thermoplastic ethyl cellulose composition is molded or shaped under heat and pressure normally tending to cause discoloration of the composition, the improvement which comprises distributing in the composition butadiene sulfone in an amount at least about 0.005% and not more than 2% of the weight of the ethyl cellulose on the basis of the content of combined sulfur dioxide and from about 0.5 to about 5% of 1-para-phenylol para-menthane, and then shaping the composition under heat sufficient to cause release of sulfur dioxide in the shaping operation, whereby said composition is stabilized with respect to viscosity and color during and after said shaping operation.

11. In a process in which a thermoplastic ethyl cellulose composition is molded or shaped under heat and pressure normally tending to cause discoloration of the composition, the improvement which comprises distributing in the composition sodium sulfodioctyl succinate in an amount at least about 0.005% and not more than 2% of the weight of the ethyl cellulose on the basis of the content of combined sulfur dioxide and from about 0.5% to about 5% of 1-para-phenylol para-menthane, and then shaping the composition under heat sufficient to cause release of sulfur dioxide in the shaping operation, whereby said composition is stabilized with respect to viscosity and color during and after said shaping operation.

12. A stabilized cellulose ether composition comprising a thermoplastic cellulose ether, a sulfur dioxide-producing compound which is substantially colorless, which does not discolor under heat, which does not in itself function as an acid stronger than sulfurous acid and which releases sulfur dioxide at 200° C., in an amount at least about 0.005% and not more than 2% of the weight of the cellulose ether on the basis of combined sulfur dioxide, and a substituted terpene compound having the formula

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, said composition being stabilized with respect to viscosity and color during and after exposure to heat and light by virtue of the presence therein of said substituted terpene compound and said sulfur dioxide-releasing compound.

13. A stabilized cellulose ether composition comprising a thermoplastic cellulose ether, a sulfur dioxide-producing compound which is substantially colorless, which does not discolor under heat, which does not in itself function as an acid stronger than sulfurous acid and which releases sulfur dioxide at 200° C., in an amount between about 0.005% and about 0.5% of the weight of the cellulose ether on the basis of the content of combined sulfur dioxide, and a substituted terpene compound having the formula

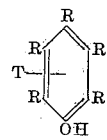

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, in an amount of about 0.5% to about 5% of the cellulose ether, said composition being stabilized with respect to viscosity and color during and after exposure to heat and light by virtue of the presence therein of said substituted terpene compound and said sulfur dioxide-releasing compound.

14. A stabilized cellulose ether composition comprising a thermoplastic ethyl cellulose, an alkyl diene sulfone which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and a substituted terpene compound having the formula

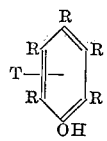

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, in an amount of about 0.5% to about 5% of the ethel cellulose, said composition being stabilized with respect to viscosity and color during and after exposure to heat and light by virtue of the presence therein of said substituted terpene compound and said sulfur dioxide-releasing compound.

15. A stabilized cellulose ether composition comprising a thermoplastic ethyl cellulose, butadiene sulfone in an amount between about 0.01% and about 2.0% of the weight of the ethyl cellulose, and a substituted terpene compound having the formula

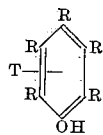

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, in an amount of about 0.5% to about 5% of the ethyl cellulose, said composition being stabilized with respect to viscosity and color during and after exposure to heat and light by virtue of the presence therein of said substituted terpene compound and said butadiene sulfone.

16. A stabilized cellulose ether composition comprising a thermoplastic ethyl cellulose, a sulfodialkyl succinate which is substantially colorless, which does not discolor under heat, which does not in itself function as an acid stronger than sulfurous acid and which releases sulfur dioxide at 200° C., in an amount between about 0.005% and about 0.29% of the weight of the ethyl cellulose on the basis of the content of combined sulfur dioxide, and a substituted terpene compound having the formula

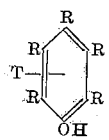

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, in an amount of about 0.5% to about 5% of the ethyl cellulose, said composition being stabilized with respect to viscosity and color during and after exposure to heat and light by virtue of the presence therein of said substituted terpene compound and sulfur dioxide-releasing compound.

17. A stabilized cellulose ether composition comprising a thermoplastic ethyl cellulose, sodium sulfodioctyl succinate in an amount between about 0.05% and about 4.0% of the weight of the ethyl cellulose, and a substituted terpene compound having the formula

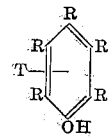

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, in an amount of about 0.5% to about 5% of the ethyl cellulose, said composition being stabilized with respect to viscosity and color during and after exposure to heat and light by virtue of the presence therein of said substituted terpene compound and said sodium sulfodioctyl succinate.

18. A stabilized cellulose ether composition comprising a thermoplastic ethyl cellulose, an aliphatic organic sulfite which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and a substituted terpene compound having the formula

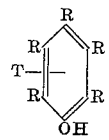

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, in an amount of about 0.5% to about 5% of the ethyl cellulose, said composition being stabilized with respect to viscosity and color during and after exposure to heat and light by virtue of the presence therein of said substituted terpene compound and said sulfur dioxide-releasing compound.

19. A stabilized cellulose ether composition comprising a thermoplastic ethyl cellulose, diethyl sulfite in an amount between about 0.005% and about 0.5% of the weight of the ethyl cellulose on the basis of the content of combined sulfur dioxide, and a substituted terpene compound having the formula

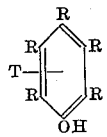

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, in an amount of about 0.5% to about 5% of the ethyl cellulose, said composition being stabilized with respect to viscosity and color during and after exposure to heat and light by virtue of the presence therein of said substituted terpene compound and said diethyl sulfite.

20. A stabilized cellulose ether composition comprising a thermoplastic ethyl cellulose, a sulfur dioxide-producing compound which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and a monophenylol saturated monocyclic terpene in an amount of about 0.5% to about 5% of the ethyl cellulose, said composition being stabilized with respect to viscosity and color during and after exposure to heat and light by virtue of the presence therein of said monophenylol saturated monocyclic terpene and said sulfur dioxide-releasing compound.

21. A stabilized cellulose ether composition comprising a thermoplastic ethyl cellulose, a sulfur dioxide-producing compound which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and 1-para-phenylol para-menthane in an amount of about 0.5% to about 5% of the ethyl cellulose, said composition being stabilized with respect to viscosity and color during and after exposure to heat and light by virtue of the presence therein of said 1-para-phenylol para-menthane and said sulfur dioxide-releasing compound.

22. A stabilized cellulose ether composition comprising a thermoplastic ethyl cellulose, butadiene sulfone in an amount between about 0.01% and about 2.0% of the weight of the ethyl cellulose, and 1-para-phenylol para-menthane in an amount of about 0.5% to about 5% of the ethyl cellulose, said composition being stabilized with respect to viscosity and color during and after exposure to heat and light by virtue of the presence therein of said 1-para-phenylol para-menthane and said butadiene sulfone.

23. A stabilized cellulose ether composition comprising a thermoplastic ethyl cellulose, sodium sulfodioctyl succinate in an amount between about 0.05% and about 4.0% of the weight of the ethyl cellulose, and 1-para-phenylol para-menthane in an amount of about 0.5% to about 5% of the ethyl cellulose, said composition being stabilized with respect to viscosity and color during and after exposure to heat and light by virtue of the presence therein of said 1-para-phenylol para-menthane and said sodium sulfodioctyl succinate.

GEORGE H. PYLE.
DAVID R. WIGGAM.

REFERENCES CITED

The following references are of record in the file of this patent:

UNITED STATES PATENTS

| Number | Name | Date |
|---|---|---|
| 572,135 | Stevens | Dec. 1, 1896 |
| 738,533 | Eichengrun | Sept. 8, 1903 |
| 1,510,735 | Baybutt | Oct. 7, 1924 |
| 1,870,175 | Dreyfus | Aug. 2, 1932 |
| 1,973,398 | Trolander et al. | Sept. 11, 1934 |
| 2,059,619 | Trail | Nov. 3, 1936 |
| 2,109,593 | Macht | Mar. 1, 1938 |
| 2,151,476 | Kimble et al. | Mar. 21, 1939 |
| 2,275,716 | Bachman | Mar. 10, 1942 |
| 2,321,069 | Dreyfus | June 8, 1943 |
| 2,356,840 | Frey | Aug. 29, 1944 |

FOREIGN PATENTS

| Number | Country | Date |
|---|---|---|
| 489,974 | Great Britain | Aug. 8, 1938 |
| 679,201 | France | Apr. 10, 1930 |
| 741,975 | France | Feb. 24, 1933 |

Certificate of Correction

Patent No. 2,564,581                                        August 14, 1951

GEORGE H. PYLE ET AL.

It is hereby certified that error appears in the printed specification of the above numbered patent requiring correction as follows:

Column 5, line 21, for "One-eight" read *One-eighth*; column 6, line 1, for "methane" read *menthane*; column 13, line 41, for "0.5" read *0.5%*; column 16, line 45, after "and" insert *from about 0.5% to about 5% of*; column 17, line 47, for "ethel" read *ethyl*; column 20, line 7, for "penylol" read *phenylol*;

and that the said Letters Patent should be read as corrected above, so that the same may conform to the record of the case in the Patent Office.

Signed and sealed this 30th day of October, A. D. 1951.

[SEAL]

THOMAS F. MURPHY,
                                                                  *Assistant Commissioner of Patents.*